United States Patent [19]

Finnell

[11] Patent Number: 4,679,167
[45] Date of Patent: Jul. 7, 1987

[54] APPARATUS FOR LOCATING A MEMORY MODULE WITHIN A MEMORY SPACE

[75] Inventor: James S. Finnell, San Jose, Calif.

[73] Assignee: Hewlett-Packard Company, Palo Alto, Calif.

[21] Appl. No.: 518,600

[22] Filed: Jul. 29, 1983

[51] Int. Cl.$^4$ .................. G06F 12/06; G06F 13/00
[52] U.S. Cl. .................................................. 364/900
[58] Field of Search ... 364/200 MS File, 900 MS File

[56] References Cited

U.S. PATENT DOCUMENTS

| 4,030,073 | 6/1977 | Armstrong, Jr. | 364/200 |
| 4,236,207 | 11/1980 | Rado | 364/200 |
| 4,285,039 | 8/1981 | Patterson et al. | 364/200 |
| 4,571,676 | 2/1986 | Mantellina et al. | 364/200 |

Primary Examiner—Eddie P. Chan
Attorney, Agent, or Firm—Douglas A. Kundrat

[57] ABSTRACT

The individual RAMs comprising the memory space of a computer are automatically located within a memory space during initialization and address enable information is stored in ID-RAMs on each RAM card. Shift registers on the RAM cards are connected in series and during initialization an ID bit is serially clocked through the shift registers. At each clock pulse the contents of the shift registers are written to the ID-RAMs of each RAM card. The presence of an ID bit at a specific memory location in an ID-RAM on a RAM card indicates that that card is to be enabled when the memory location address is accessed; the location of the ID bit within the memory location indicates the particular RAM on the RAM card to be accessed.

3 Claims, 5 Drawing Figures

APPARATUS FOR LOCATING A MEMORY MODULE WITHIN A MEMORY SPACE

BACKGROUND OF THE INVENTION

The memory space of a computer is often composed of random access memories (RAMs) residing on RAM cards which are connected to the data and address busses of the computer. Each RAM has a predetermined address within the memory space and each individual RAM memory location has a specific address within the RAM. In practice, the upper bits of a memory address specify a particular RAM and the lower bits specify a given memory location within that RAM.

In computers which are constructed according to the prior art it is known to specify the location of a RAM within the memory space by physically setting an address on a switch array. A given RAM is enabled when a comparator on the RAM card indicates that an address on the bus is the same as the RAM address on the switch array. In such prior art computers it is necessary for the user to set the specified address of each RAM on the RAM card switch array. The use of such switches introduces the possibility of user error and user-caused damage to the computer.

SUMMARY OF THE INVENTION

In accordance with the illustrated preferred embodiment of the present invention, the RAMs comprising the memory space of a computer are automatically located within the memory space and enable information is stored in ID-RAMs on each RAM card. Each card includes three RAMs, a data buffer, an ID-RAM and a three cell shift register. Each shift register cell is capable of storing a single bit. The shift registers of the various RAM cards are connected in series and during initialization an ID "1" bit is clocked through the shift registers. At each clock pulse the three bit contents of each shift register are written to the ID-RAM for that shift register. Thus, only three memory locations within each ID-RAM contain ID bits and the addresses of those three ID-RAM memory locations comprise the upper bits of the addresses of the RAMs on the RAM card. The location of the ID bit within the three bit memory location indicates which of the three RAMs on the RAM card is thereby accessed. The lower bits of the address specify individual memory locations within each RAM.

BRIEF DESCRIPTION OF THE DRAWINGS

FIG. 3 shows the addresses of the RAMs depicted in FIG. 2

FIG. 5 shows the contents of the ID-RAMs depicted in FIG. 2 after memory initialization has been performed according to the flow chart of FIG. 4.

DETAILED DESCRIPTION OF THE PREFERRED EMBODIMENT

Figure 1:
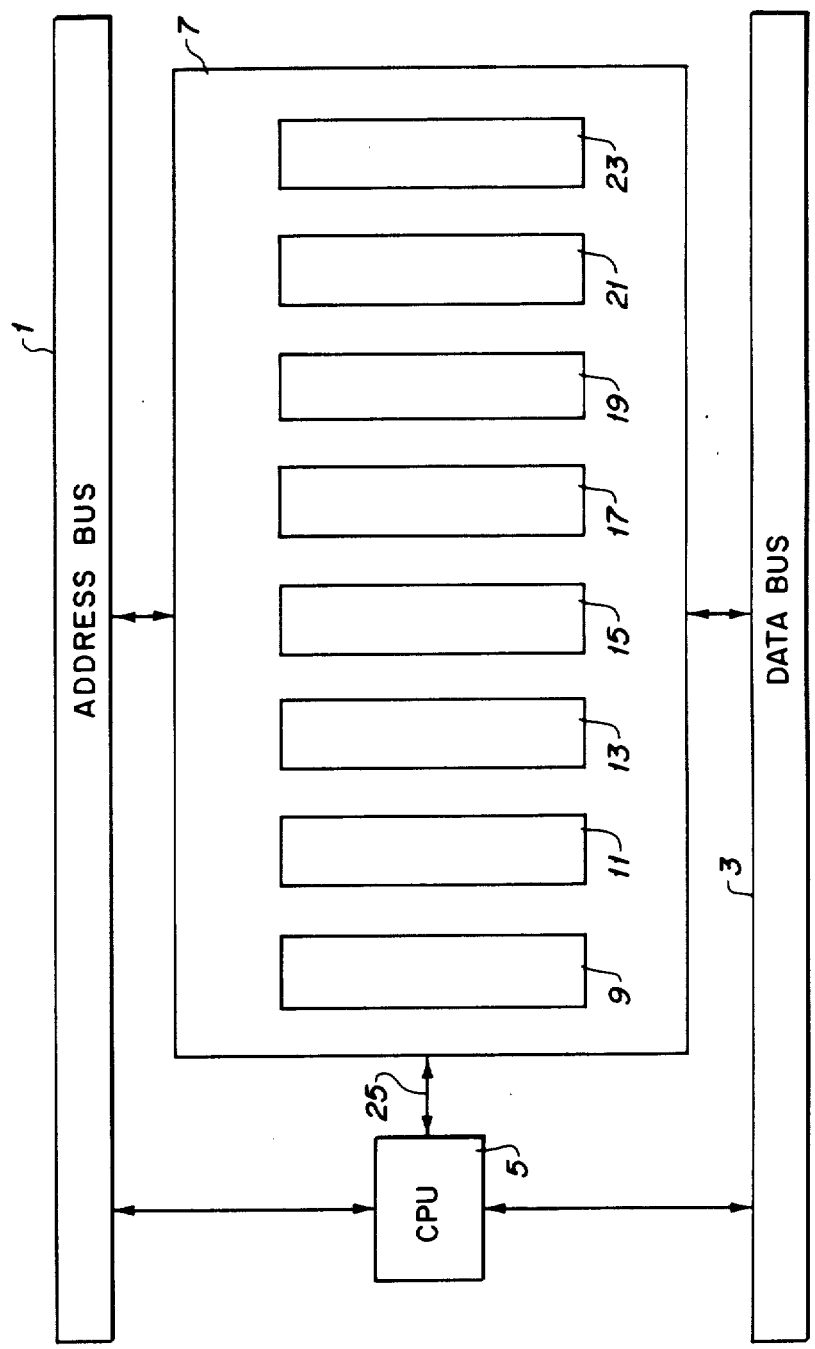
FIG. 1 shows the connections of the memory space of a computer which is constructed in accordance with the preferred embodiment of the present invention.

FIG. 1 shows a computer which is constructed in accordance with the preferred embodiment of the present invention. A CPU 5 is connected to a memory space 7 by a data bus 3, an address bus 1 and control lines 25. Memory space 7 comprises various RAM cards 9-23 which in turn each contain a number of RAMs in which the individual memory locations are physically located.

Figure 2:
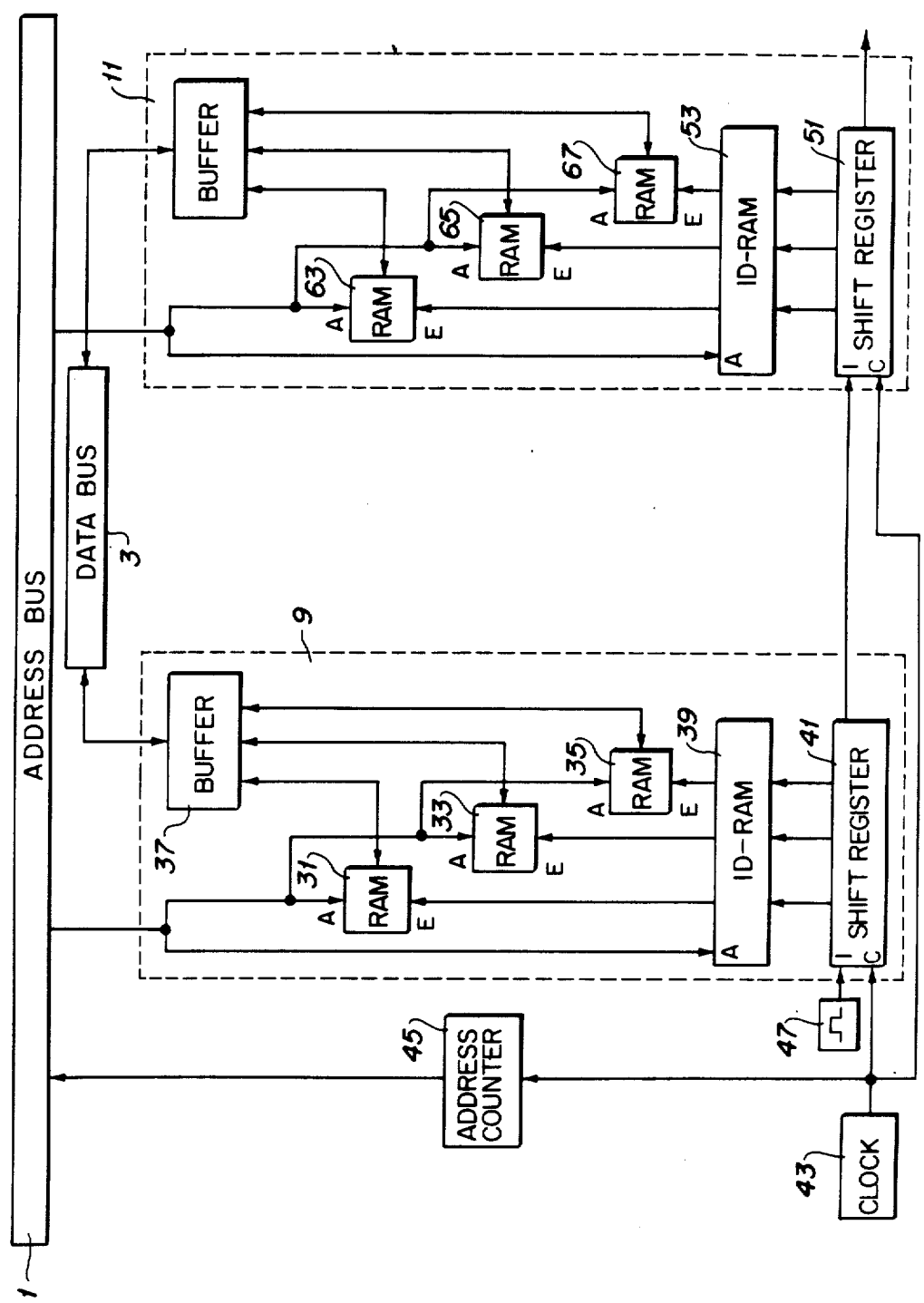
FIG. 2 shows two of the RAM cards depicted in FIG. 1.

FIG. 2 shows two of the RAM cards 9 and 11 which are depicted in FIG. 1. RAM cards 9-23 are identical and interchangeable and the number of RAM cards used in memory space 7 is a matter of design choice. RAM card 9 includes three RAMs 31, 33 and 35 which may comprise 64K RAMs and which are connected by a buffer 37 to the data bus 3. RAM card 11 includes RAMs 63, 65 and 67. It is important to note that each RAM card of memory space 7 is not limited to an even number of RAMs as is the case in the prior art. The address bus 1, which may comprise a 23-bit bus, is connected to the three RAMs 31, 33 and 35 and to an ID-RAM 39. The seven most significant bits of an address on address bus 1 are routed to the ID-RAM 39 and the lower address bits are routed to address pins A of the three RAMs 31, 33 and 35. The ID-RAM 39 comprises a four bit wide 1K static RAM of which only 128 memory locations (each being three bits wide) are used. The number of columns (three) in ID-RAM 39 is equal to the number of RAMs on RAM card 9 and the number of rows (128) of ID-RAM 39 is equal to the total number of RAMs in memory space 7. Each of the three columns with ID-RAM 39 is connected to read one of the three cells of shift register 41. Each column of ID-RAM 39 is also connected to an enable (E) input of one of the RAMs 31, 33 or 35.

To initialize the memory space 7, a clock 43 generates clock pulses to a clock (C) input of shift register 41 and to an address counter 45. The seven-bit counter 45 is incremented at each clock pulse and presents a seven bit count to address bus 1 which presents the seven bit count as the upper seven bits of an address to an address (A) pin of ID-RAM 39. A specific memory location within ID-RAM 39 is thereby accessed. A bit generator 47 presents an ID "1" bit to an input (I) pin of shift register 41 (located on the bottom RAM card 9 of the memory space 7) during the first clock pulse after power is applied to the computer and thereafter presents a "0" bit. The shift register 41 is connected in series with a shift register 51 of the next RAM card 11 in the memory space 7. The shift registers of all of the RAM cards 9-23 located in memory space 7 are connected in series and the ID "1" bit may be clocked through the individual cells of the shift registers serially.

Figures 3, 5:
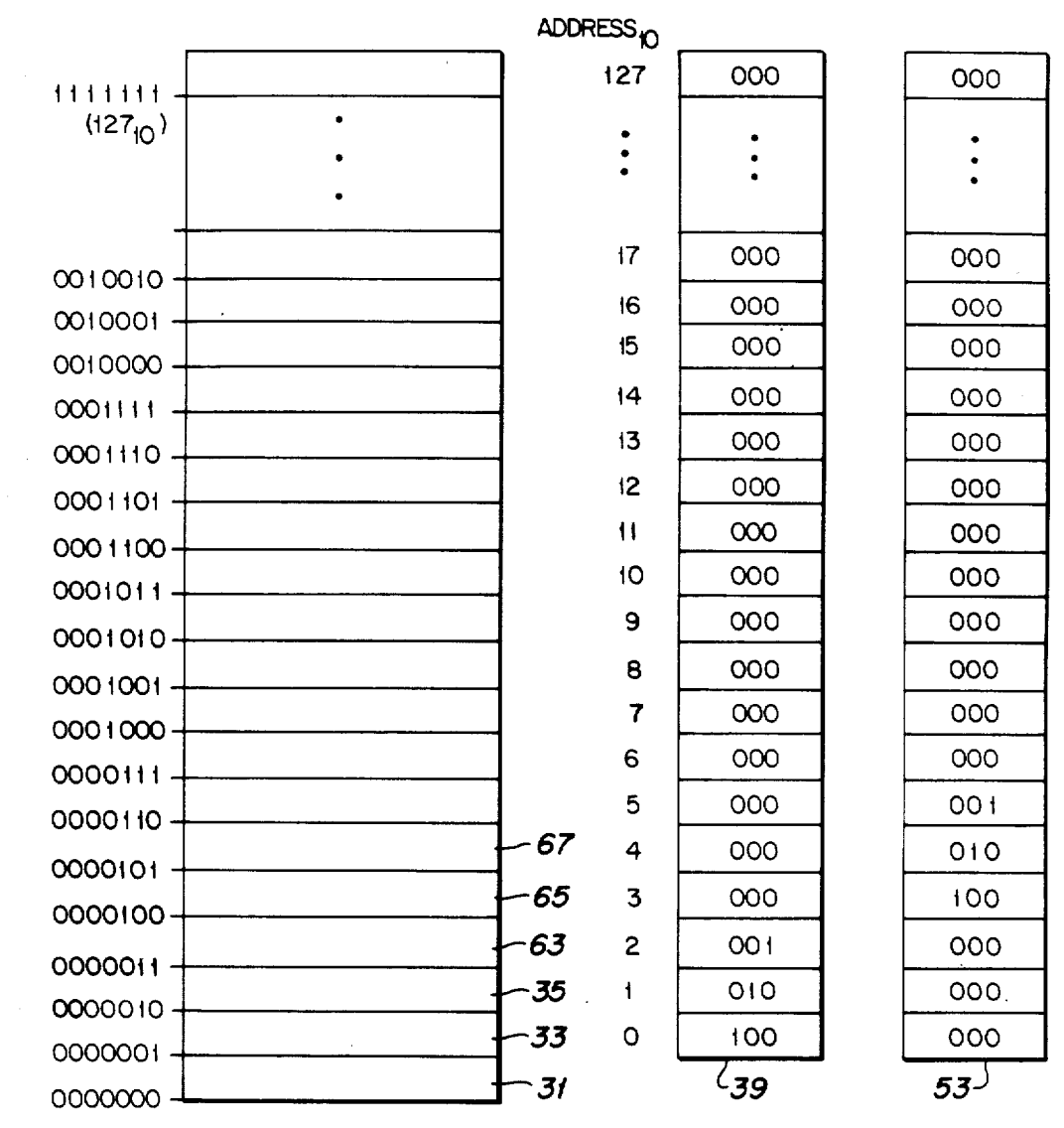

FIG. 3 shows the addresses of the various RAMs located in memory space 7. RAM 31 is located at address 0000000, RAM 33 is located at address 0000001, and RAM 35 is located at address 0000010, etc. If the RAMs within memory space 7 all comprise 64K RAMs, then the memory space 7 is broken into 64K blocks and the upper seven bits of a 23-bit address on address bus 1 specify a particular RAM out of the 128 possible RAMs and the lower sixteen bits specify a particular location within that module.

Figure 4:
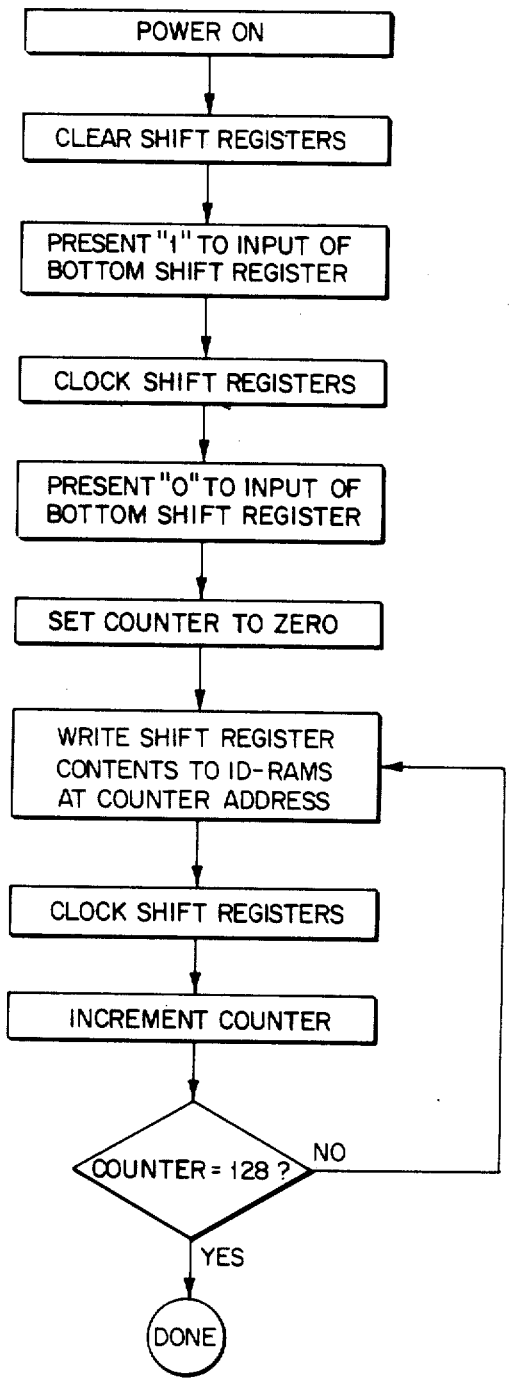
FIG. 4 is a flow chart of the memory initialization functions performed by the computer shown in FIGS. 1 and 2.

FIG. 4 is a flow chart of the functions performed by the computer during initialization of memory space 7 when power is first turned on. At turn on, all of the shift registers, including shift register 41 on RAM card 9 and shift register 51 on RAM card 11, are cleared and the cell contents are reset to zero. Generator 47 then presents an ID "1" bit to the input (I) pin of the shift register 41 on RAM card 9 which is located at the bottom of memory space 7. When the first clock pulse is generated by clock 43 the ID bit is read into the left cell of shift register 41. Generator 47 thereafter presents a "0" bit to the input I pin of shift register 41. The seven bit address counter 45 is reset to zero by the first clock pulse.

The seven bits of counter 45 are routed, via address bus 1, to the A pins of all of the ID-RAMs in memory space 7. Since the counter 45 is set to 0 at this point the lowest memory location (address 0) of each of the ID-RAMs is accessed. The contents of the three cells of each shift register are written into the accessed memory location of the ID-RAM on each shift register's RAM card. Thus, the address 0 memory location of ID-RAM 39 is loaded with the three-bit code "100". All of the other ID-RAMs in memory space 7 have address 0 memory locations loaded with code "000". When another clock pulse is generated by clock 43, address counter 45 is incremented and the initialization function is terminated if the contents of counter 45 are 128. Upon termination, the clock 45 is disconnected from the shift register 41 and desired data addresses may be supplied to address bus 1 by CPU 5 in order to access memory space 7.

At each clock pulse during initialization, the three bit contents of each shift register are stored in a memory location of an associated ID-RAM, counter 45 is incremented and the ID bit is shifted one cell to the right through the shift registers of memory space 7. Thus, three memory locations in each ID-RAM each contain an ID bit as shown in FIG. 5. Conceptually, the rows within each ID-RAM may be viewed as RAM card enables and the columns may be viewed as individual RAM enables.

Once the initialization function has been completed, CPU 5 may access a specific memory location within memory space 7 by presenting a 23-bit address to address bus 1. The upper seven bits of the address are routed to the A pins of all of the ID-RAMs and the lower 16 bits are routed to the A pins of the various individual RAMs. The upper seven bits cause identical memory locations in each ID-RAM to be accessed and the three bits contained therein are presented to the enable (E) pins of the three RAMs on each RAM card. Only a single RAM is thereby enabled. The lower sixteen bits of the address allow a particular memory location within the enabled RAM to be accessed. For example, if a 23-bit address of 00000100000000000000000 is presented to address bus 1 the upper seven bits (0000010) are routed to the A pins of the ID-RAMs and the lower (all zero) sixteen bits are routed to the A pins of the RAMs. From FIG. 5 it can be seen that the only ID-RAM having a memory location 0000010 with non-zero contents is ID-RAM 39 on RAM card 9. Memory location 0000010 in ID-RAM 39 contains "001" so that a "0" is presented to the E pin of RAM 31, a "0" is presented to the E pin of RAM 33 and a "1" is presented to the E pin of RAM 35. The result is that only RAM 35 in memory space 7 is enabled and the lower sixteen bits of the address cause the memory location at row 0, column 0, of RAM 35 to be accessed by CPU 5.

I claim:

1. An initialization circuit for initializing a memory space having a plurality of RAMs residing on a plurality of RAM cards with n RAMs on each RAM card, the circuit comprising:
   a clock;
   a pulse generator;
   an address counter having an input coupled to the clock and an output;
   a plurality of n-cell shift registers, each being resident on a RAM card and each shift register having a data input and a data output and also having a clock input coupled to the clock;
   a plurality of ID-RAMs each having a plurality of n-bit wide memory locations, each ID-RAM residing on a RAM card and having an address input coupled to the address counter output and a data input coupled to the shift register of that RAM card for receiving the n-bit contents of that shift register;
   wherein the data input of a first of the shift registers is coupled to the pulse generator and the data output of the first shift register is coupled to the data input of a second shift register, each succeeding shift register being connected in series with the others;
   wherein each of the n RAMs on each RAM card has an enable input coupled to the associated column within the ID-RAM on that RAM card; and
   such that a "1" bit generated by the pulse generator being clocked through the serially connected shift registers causes a plurality of n-bit codes to be stored in the ID-RAMS, thereby enabling only a single RAM within the memory space upon access of a selected ID-RAM memory location.

2. A circuit as in claim 1, wherein the number of memory locations within each ID-RAM is equal to the number of RAMs in the memory space.

3. A circuit as in claim 2, further comprising:
   an address bus, coupled between the address counter and the address inputs of the ID-RAMs at the memory locations specified by the address counter and the RAMs;
   the address bus being operative for receiving an address from an external source and for presenting an upper portion of the received address to the address inputs of the ID-RAMs and a lower portion of the received address to the address inputs of the RAMs; and
   such that the upper portion of the received address selects a particular RAM within the memory space and the lower portion of the received address selects a particular location within the selected RAM.

* * * * *